US012565240B2

(12) United States Patent
Malekmohammadi et al.

(10) Patent No.: US 12,565,240 B2
(45) Date of Patent: Mar. 3, 2026

(54) METHOD AND SYSTEM FOR GRAPH NEURAL NETWORK BASED PEDESTRIAN ACTION PREDICTION IN AUTONOMOUS DRIVING SYSTEMS

(71) Applicants: Saber Malekmohammadi, Toronto (CA); Tiffany Yee Kay Yau, Markham (CA); Amir Rasouli, Maple (CA); Mohsen Rohani, Thornhill (CA); Jun Luo, Toronto (CA)

(72) Inventors: Saber Malekmohammadi, Toronto (CA); Tiffany Yee Kay Yau, Markham (CA); Amir Rasouli, Maple (CA); Mohsen Rohani, Thornhill (CA); Jun Luo, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 18/309,150

(22) Filed: Apr. 28, 2023

(65) Prior Publication Data

US 2023/0257003 A1 Aug. 17, 2023

Related U.S. Application Data

(63) Continuation of application No. PCT/CA2021/051539, filed on Nov. 1, 2021.

(Continued)

(51) Int. Cl.
*B60W 60/00* (2020.01)
*G06V 10/762* (2022.01)
(Continued)

(52) U.S. Cl.
CPC ..... *B60W 60/0027* (2020.02); *G06V 10/7635* (2022.01); *G06V 10/77* (2022.01);
(Continued)

(58) Field of Classification Search
CPC ..... B60W 60/0027; B60W 2554/4029; B60W 2554/4044; B60W 2554/4049;
(Continued)

(56) References Cited

U.S. PATENT DOCUMENTS 9,495,874 B1 11/2016 Zhu et al.
2010/0205132 A1 8/2010 Taguchi
(Continued)

FOREIGN PATENT DOCUMENTS

DE 102017004114 A1 1/2018

OTHER PUBLICATIONS

Dimitrievski et al, Behavioral Pedestrian Tracking Using a Camera and LiDAR Sensors on a Moving Vehicle, 2019, Sensors (2019), 19: 1-34. (Year: 2019).*

(Continued)

*Primary Examiner* — Kathleen M Broughton

(57) ABSTRACT

The present disclosure relates to methods and systems for spatiotemporal graph modelling of road users in observed frames of an environment in which an autonomous vehicle operates (i.e. a traffic scene), clustering of the road users into categories, and providing the spatiotemporal graph to a trained graphical convolutional neural network (GNN) to predict a future pedestrian action. The future pedestrian action can be: one of the pedestrian will cross a road and the pedestrian will not cross the road. The spatiotemporal graph includes a better understanding of the observed frames (i.e. traffic scene).

18 Claims, 9 Drawing Sheets

Related U.S. Application Data

(60) Provisional application No. 63/108,336, filed on Oct. 31, 2020.

(51) Int. Cl.
  *G06V 10/77* (2022.01)
  *G06V 20/58* (2022.01)

(52) U.S. Cl.
  CPC ..... *G06V 20/58* (2022.01); *B60W 2554/4029* (2020.02); *B60W 2554/4044* (2020.02); *B60W 2554/4049* (2020.02)

(58) Field of Classification Search
  CPC .. G06V 10/7635; G06V 10/77; G06V 10/762; G06V 10/82; G06V 20/58; G06N 3/045; G06N 3/08; G06N 20/00
  See application file for complete search history.

(56) References Cited

U.S. PATENT DOCUMENTS

| | | |
|---|---|---|
| 2013/0054106 A1 | 2/2013 | Schmudderich et al. |
| 2017/0057497 A1* | 3/2017 | Laur ...................... G06V 20/58 |
| 2020/0023842 A1* | 1/2020 | Gutierrez ............... G06V 10/82 |
| 2020/0218913 A1* | 7/2020 | Unnikrishnan ....... G01S 13/867 |
| 2020/0223451 A1* | 7/2020 | Shashua .......... B60W 30/18159 |
| 2021/0103742 A1* | 4/2021 | Adeli-Mosabbeb ... G06V 40/10 |
| 2021/0201052 A1* | 7/2021 | Ranga ...................... G06N 3/08 |
| 2021/0295531 A1* | 9/2021 | Mangalam ............. G08G 1/005 |

OTHER PUBLICATIONS

Votz et al, Inferring Pedestrian Motions at Urban Crosswalks, 2019, IEEE Transactions on Intelligent Transportation Systems, 20(2):544-555. (Year: 2019).*

Xue et al, Crossing-Road Pedestrian Trajectory Prediction via Encoder-Decoder LSTM, 2019, IEEE Intelligent Transportation Systems Conference, pp. 1-7. (Year: 2019).*

T. Kipf and M. Welling, "Semi-supervised classification with graph convolutional networks," in ICLR, 2017.

M. Ester, H.-P. Kriegel, J. Sander, and X. Xu, "A density-based algorithm for discovering clusters in large spatial databases with noise," in International Conference on Knowledge Discovery and Data Mining, 1996.

Diehl, Frederik et al., "Graph Neural Networks for Modelling Traffic Participant Interaction" 2019 IEEE.

C. Yu, et.al., "Spatio-Temporal Graph Transformer Networks for Pedestrian Trajectory Prediction", arXiv, Jul. 2020.

B. Liu, et.al., "Spatio-temporal Relationship Reasoning for Pedestrian Intent Prediction", IEEE RA-L, Feb. 2020.

S. Haddad, et al., "Self-Growing Spatial Graph Networks for Pedestrian Trajectory Prediction", IEEE WACV, Mar. 2020.

A. Mohammed, et al., "Social-STGCNN: A Social Spatio-Temporal Graph Convolutional Neural Network for Human Trajectory Prediction", CVPR, Jun. 2020.

J. Sun, et al., "Recursive Social Behavior Graph for Trajectory Prediction", CVPR, Jun. 2020.

Hu, Yue et al., "Collaborative Motion Prediction via Neural Motion Message Passing" CVRP 2020 Paper.

Casas, Sergio et al., "IntentNet: Learning to Predict Intention from Raw Sensor Date" 2nd Conference on Robot Learning (CoRL 2018).

Kosaraju, Vineet et al., "Social-BiGAT: Multimodal Trajectory Forecasting using Bicycle-GAN and Graph Attention Networks" NeurIPS 2019.

Mao, Wei et al., "Learning Trajectory Dependencies for Human Motion Prediction".

Manh, Huynh et al., "Scene-LSTM: A model for Human Trajectory Prediction".

S. Haddad, et.el., "Situation-Aware Pedestrian Trajectory Prediction with Spatio-Temporal Attention Model", CVWW, Feb. 2019.

Yan, Sijie et al., "Spatial Temporal Graph Convolutional Networks for Skeleton-Based Action Recognition" AAAI-18.

Sun, Chen et al., "Relational Action Forecasting".

H. Zhao, et.el., "TNT: Target-driveN Trajectory Prediction", arXiv, Aug. 2020.

Zhang, Zhishuai et al., "STINet: Spatio-Temporal-Interactive Network for Pedestrian Detection and Trajectory Predication" CVRP 2020.

* cited by examiner

Matrix $A_2$

| $v^p$ | $v^{ru}_1$ | $v^{ru}_2$ | $v^{ru}_3$ | $v^{ru}_4$ | $v^{ru}_5$ | $v^{ru}_6$ | $v^{ru}_7$ |
|---|---|---|---|---|---|---|---|
| 1 | a1 | a2 | a3 | a4 | a5 | a6 | a7 |
| a1 | 1 | 1 | | | | | |
| a2 | 1 | 1 | | | | | |
| a3 | | | 1 | 1 | 1 | | |
| a4 | | | 1 | 1 | 1 | | |
| a5 | | | 1 | 1 | 1 | | |
| a6 | | | | | | 1 | 1 |
| a7 | | | | | | 1 | 1 |

| $v^p$ |
|---|
| $v^{ru}_1$ |
| $v^{ru}_2$ |
| $v^{ru}_3$ |
| $v^{ru}_4$ |
| $v^{ru}_5$ |
| $v^{ru}_6$ |
| $v^{ru}_7$ |

FIG. 8

METHOD AND SYSTEM FOR GRAPH NEURAL NETWORK BASED PEDESTRIAN ACTION PREDICTION IN AUTONOMOUS DRIVING SYSTEMS

RELATED APPLICATIONS

This application is a continuation of International Patent Application No. PCT/CA2021/051539, filed Nov. 1, 2021, entitled "METHOD AND SYSTEM FOR GRAPH NEURAL NETWORK BASED PEDESTRIAN ACTION PREDICTION IN AUTONOMOUS DRIVING SYSTEMS", the contents of which are incorporated herein by reference, and claims priority to and the benefit of U.S. Provisional Patent Application No. 63/108,336, filed Oct. 31, 2020, entitled "METHOD AND SYSTEM FOR GRAPH NEURAL NETWORK BASED PEDESTRIAN ACTION PREDICTION IN AUTONOMOUS DRIVING SYSTEMS", the contents of which are incorporated herein by reference.

FIELD

The present disclosure generally relates to methods and systems for pedestrian action prediction in autonomous driving systems, and in particular to graph neural network based methods and systems for pedestrian action prediction in autonomous driving systems.

BACKGROUND

Autonomous vehicles (i.e. self-driving cars) include an autonomous driving system (ADS) that controls autonomous operation of the autonomous vehicle in an environment. An autonomous vehicle includes different types of environment sensors (e.g. cameras, such as optical cameras, and detection and ranging sensors, such a light detection and ranging (LIDAR) sensors) mounted to the autonomous vehicle which sense the environment surrounding the autonomous vehicle. The ADS of the autonomous vehicle includes subsystems, that process environmental sensor data received from the different types of sensors (e.g. image data from the camera, a three-dimensional point cloud from the detection and ranging sensor) to generate a map of the environment surrounding the vehicle that includes the vehicle and each road user in the environment. The ADS system further includes a planning subsystem that plans a geometric path for the autonomous vehicle and controls operation of the autonomous vehicle in accordance with the planned path.

The ADS may also one or more machine-learning based behavior prediction subsystems. It is important for the ADS to be able to generate predictions of how dynamic objects in the vicinity of the autonomous vehicle will behave (e.g., how a pedestrian will move when crossing a street), so that a desired behavior of the autonomous vehicle (e.g., to avoid striking a pedestrian crossing a street) can be planned. One such subsystem is referred to as a pedestrian action prediction (i.e. pedestrian intent prediction) subsystem. A pedestrian action prediction subsystem can, for example, predict a trajectory of a pedestrian that is close to the autonomous vehicle (e.g. within approximately 30 m of the autonomous vehicle) and then predict a pedestrian action based on the predicted trajectory of the pedestrian. The predicted pedestrian action can be one of: (a) the pedestrian will cross in front of the autonomous vehicle, or (b) the pedestrian will not cross in front of the autonomous vehicle. Alternatively, a pedestrian action prediction subsystem can model a pedestrian's interaction with dynamic objects in their surrounding environment using a graph and predict a future action of the pedestrian using a graph neural network. The planning system then uses predicted pedestrian action to modify a planned path of the autonomous vehicle in order to avoid a collision with the pedestrian.

Predicting a pedestrian action is complex task which is computationally intensive because it requires modelling a pedestrian's interaction with their surrounding environment, which is dependent on multiple environmental factors and the spatiotemporal context of the environment. Improvements in method and systems for predicting a pedestrian's action is therefore desirable.

SUMMARY

The present disclosure describes example methods and systems for spatiotemporal graph modelling of road users observed in a frame of an environment in which an autonomous vehicle operates (i.e. a traffic scene), clustering of the road users into categories, and providing the spatiotemporal graph to a trained graphical convolutional neural network (GNN) to predict a future pedestrian action. The future pedestrian action can be: one of the pedestrian will cross a road and the pedestrian will not cross the road.

In accordance with one example aspect, there is provided a computer implemented method for predicting a pedestrian action. The method includes receiving a temporal sequence of observed frames, each observed frame including spatial information for a target pedestrian and a plurality of road users. For each observed frame in the sequence of observed frames, the method includes: encoding, based at least on the spatial information included in the observed frame, a set of target pedestrian features for the target pedestrian and a respective set of road user features for each of the plurality of road users; and generating, based at least on the spatial information included in the observed frame, a set of relative importance weights that includes, for each of the road users, a respective relative importance weight that indicates a relative importance of the road user to the target pedestrian, the respective relative importance weight for each road user being based both on a distance between the road user and the target pedestrian and a relative location importance of the road user to target pedestrian. The method also includes predicting, based on the set of target pedestrian features encoded for each of a plurality of the observed frames, the respective sets of road user features encoded for each of the plurality of the observed frames, and the set of relative importance weights generated for each of the plurality of the observed frames, a future action of the target pedestrian. An action of an autonomous vehicle can be automatically controlled based on the predicted future action of the target pedestrian.

In accordance with the preceding aspect of the computer-implemented method, the relative location importance for each road user may be based on a direction of movement of the road user relative to the target pedestrian.

In one or more of the preceding aspects of the computer-implemented method, the relative location importance for each road user may be given a greater importance if the road user is moving towards the target pedestrian than if the road user is moving away from the target pedestrian.

In one or more of the preceding aspects of the computer-implemented method, the relative location importance for each road user may be further based on a travel distance of the road user along a road relative to a position of the target pedestrian.

In one or more of the preceding aspects of the computer-implemented method, relative location importance for each road user may be based on a distance of the road user from a reference line that extends from the position of the target pedestrian and is perpendicular to a roadway direction of travel.

In one or more of the preceding aspects of the computer-implemented method, for each road user, the distance between the road user and the target pedestrian is a Euclidian distance.

In one or more of the preceding aspects of the computer-implemented method, the computer-implemented method includes for each observed frame in the sequence of observed frames: encoding the set of target pedestrian features for the target pedestrian and a respective set of road user features for each of the plurality of road users is based on the spatial information included in multiple observed frames in the sequence including the observed frame; and generating the set of relative importance weights for each road user is based on the spatial information included in multiple observed frames in the sequence including the observed frame.

In one or more of the preceding aspects of the computer-implemented method, the of the computer-implemented method includes for each observed frame in the sequence of observed frames, clustering, based on the spatial information included in multiple observed frames in the sequence including the observed frame, groups of road users from the plurality of road users into respective clusters based on behavioral similarities, and predicting the future action of the target pedestrian is also based on the clustering.

In one or more of the preceding aspects of the computer-implemented method, a respective spatial graph is generated for each of the observed frames, wherein for each observed frame: the respective spatial graph has a target pedestrian node representing the target pedestrian, and a plurality of road user nodes each representing a respective one of the plurality of road users, the respective spatial graph being defined by: (i) a feature matrix that includes the encoded target pedestrian features as features of the target pedestrian node, and includes the set of road user features encoded for the respective road users as features of the respective road user nodes; and (ii) an adjacency matrix that specifies: (a) respective weighted connecting edges between the target pedestrian node and each of the respective road user nodes corresponding to the set of relative importance weights generated for the observed frames; and (b) connecting edges between each of the road user nodes that are included in a respective cluster.

In one or more of the preceding aspects of the computer-implemented method, predicting the future action of the target pedestrian is performed using a spatiotemporal convolutional graph neural network that receives the spatial graphs generated for the observed frames.

In one or more of the preceding aspects of the computer-implemented method, the predicted pedestrian action is one of the pedestrian will cross in front of the autonomous vehicle or the pedestrian will not cross in front of the autonomous vehicle.

In examples of one or more of the preceding aspects of the computer-implemented method, the computer-implemented method includes for each observed frame in the sequence of observed frames: the set respective set of road user features encoded for each of the plurality of road users includes one or more of: a type of the road user; a location of the road user relative to the target pedestrian, a size of the road user, a velocity of the road user, and a direction of movement of the road user.

In accordance with another example aspect, there is provided a computer-implemented method for predicting a pedestrian action in an autonomous vehicle. The computer-implemented method includes receiving a set of observed frames, each observed frame comprising a pedestrian and a plurality of road users and generating, based on the set of observed frames, spatiotemporal information about the pedestrian, the spatiotemporal information about the pedestrian including a location of the pedestrian in each of the observed frames. The method also includes generating, based on the set of observed frames, spatial information about each road user in the map, the spatial information including a location of each road user in the map, generating a feature representation of the pedestrian based on the spatiotemporal information about the pedestrian, and generating, for each respective road user, a feature encoding for the respective road user based on the spatiotemporal information about the respective road user. For each respective observed frame, the method also includes generating a spatial graph based on a location of the pedestrian and a location each road in the observed frame, the spatial graph comprising a central node, a plurality of other nodes surrounding the central node, and a connection between the central node and each of the plurality of other nodes, wherein the central node is associated with the pedestrian and each other node associated with one of the plurality of road users. The method also includes generating an adjacency matrix for each spatial graph, the adjacent matrix for each spatial graph comprising, for each connection between the central node and one of the other nodes in the graph, a weight representative of an importance of the road user associated with the one other node, generating a feature encoding matrix comprising the feature encodings for the plurality of road users and the feature encoding of the pedestrian, and processing, using a spatiotemporal convolutional graph neural network, the adjacency matrix for each spatial graph and the feature representation matrix to predict the pedestrian crossing action, wherein the pedestrian cross action is one of the pedestrian is crossing in front of the autonomous vehicle or the pedestrian is not crossing in front of the autonomous vehicle.

The present disclosure also provides a processing system that includes a processor and a memory that stores machine executable instructions which when executed by the method performs any of the above-identified computer-implemented methods.

The present disclosure also provides a non-transitory computer-readable medium and a computer program that store machine executable which when executed by the method performs the any of the above-identified computer-implemented method.

BRIEF DESCRIPTION OF THE DRAWINGS

Reference will now be made, by way of example, to the accompanying drawings which show example embodiments of the present application, and in which:

FIG. 8 shows an adjacency matrix generated in respect of the observed frame of FIG. 7;

Similar reference numerals may have been used in different figures to denote similar components.

DESCRIPTION OF EXAMPLE EMBODIMENTS

The following describes technical solutions of this disclosure with reference to accompanying drawings.

As used herein, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

As used herein, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Examples of the present disclosure may be applicable in applications other than autonomous vehicles. The example methods and systems described herein may be applicable in any context where it would be useful or desirable to accurately predict the crossing action of a pedestrian in a sensed environment (also referred to as a sensed scene). A pedestrian is any human or animal in the environment whose state (e.g., position) changes over a time duration of interest (e.g., over 10 minutes).

To assist in understanding the present disclosure, an example of an autonomous vehicle in an environment is now discussed.

Figure 1:
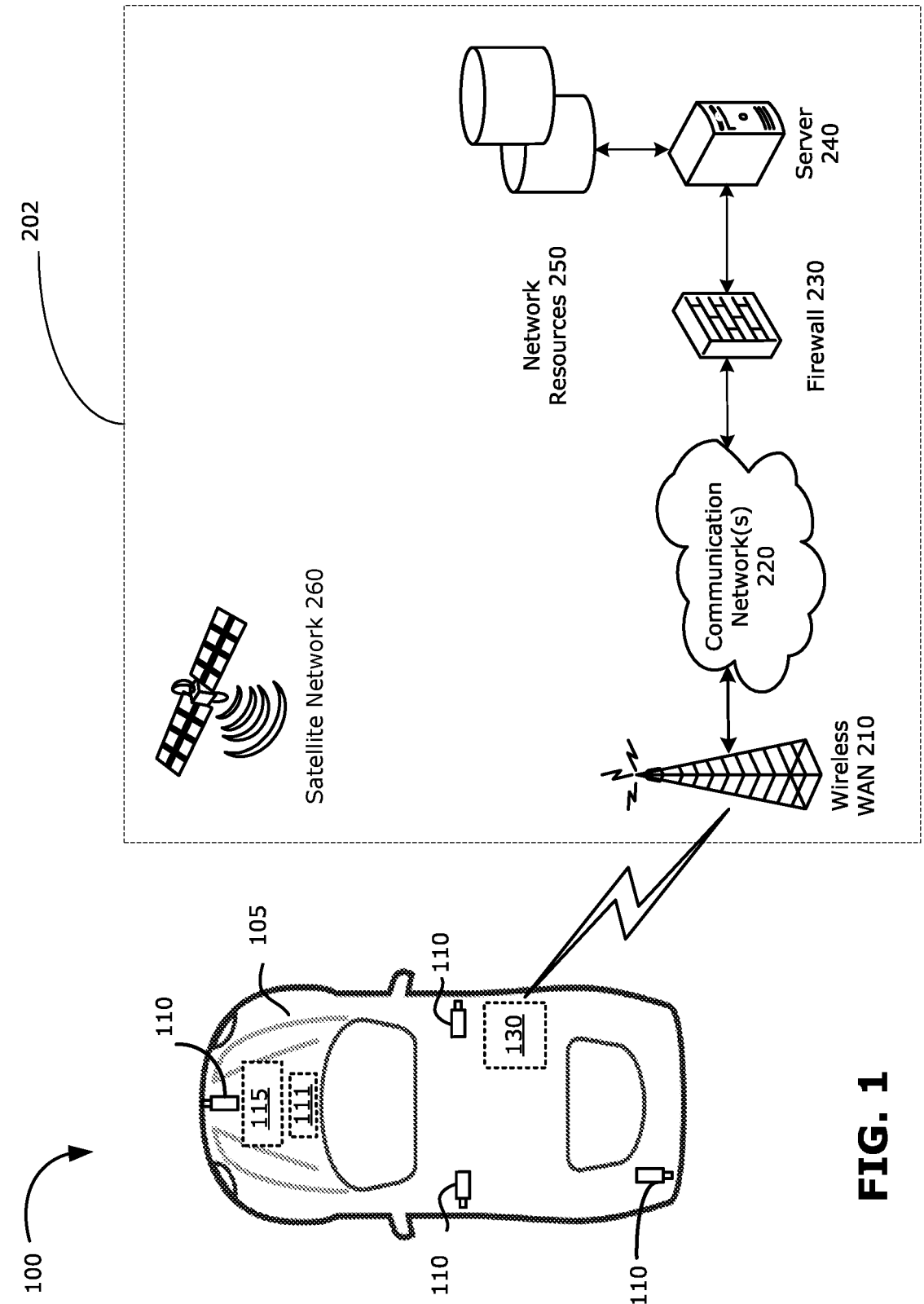
FIG. 1 is a schematic diagram showing an example environment in which an autonomous vehicle operates, in accordance with some embodiments of the present disclosure.

FIG. 1 is a schematic diagram showing an example environment 100 in which a vehicle 105 operates. Examples of the present disclosure may be implemented in the vehicle 105, for example to enable autonomous or semi-autonomous driving. The environment 100 includes a communication system 202 that communicates with the vehicle 105. The vehicle 105 includes a vehicle control system 115. The vehicle control system 115, is coupled to a drive control system and a mechanical system of the vehicle 105, as described further below with reference to FIG. 2. The vehicle control system 115 can, in various examples, enable the vehicle 105 to be operable in one or more of a fully-autonomous, semi-autonomous or fully user-controlled mode.

The vehicle 105 may include sensors, shown here as a plurality of environment sensors 110 that collect information about the external environment 100 surrounding the vehicle 105 and generate sensor data indicative of such information, and a plurality of vehicle sensors 111 that collect information about the operating conditions of the vehicle 105 and generate vehicle data indicative of such information. There may be different types of environment sensors 110 to collect different types of information about the environment 100, as discussed further below. In an example embodiment, the environment sensors 110 are mounted to and located at the front, rear, left side and right side of the vehicle 105 to collect information about the external environment 100 located in front, rear, left side and right side of the vehicle 105. For individual units of the environment sensors 110, may be mounted or otherwise located on the vehicle 105 to have different overlapping or non-overlapping fields of view (FOVs) or coverage areas to capture data about the environment 100 surrounding the vehicle 105. The vehicle control system 115 receives sensor data indicative of collected information about the external environment 100 of the vehicle 105 as collected by the environment sensors 110.

The vehicle sensors 111 provide vehicle data indicative of collected information about the operating conditions of the vehicle 105 to the vehicle control system 115 in real-time or near real-time. For example, the processing system 115 may determine a linear speed of the vehicle 105, angular speed of the vehicle 105, acceleration of the vehicle 105, engine RPMs of the vehicle 105, transmission gear and tire grip of the vehicle 105, among other factors, using vehicle data indicative of information about the operating conditions of the vehicle 105 provided by one or more of the vehicle sensors 111.

The processing system 115 includes one or more wireless transceivers 130 (as illustrated in FIG. 1) or may be coupled to one or more wireless transceivers 130 that enable the vehicle control system 115 to communicate with the communication system 202. The one or more wireless transceivers 130 enable the processing system 115 to communicate with the communication system 202. For example, the wireless transceiver(s) 130 may include one or more cellular (RF) transceivers for communicating with a plurality of different radio access networks (e.g., cellular networks) or other vehicles in the environment using different wireless data communication protocols and standards. The wireless transceiver(s) 130 may communicate with any one of a plurality of fixed transceiver base stations of a wireless wide area network (WAN) 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands. The processing system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 may be connected to network resources 250, such as supplemental data sources that may provide information to be used by the vehicle control system 115.

The wireless transceiver(s) 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol. The wireless transceiver(s) 130 may also comprise a short-range wireless transceiver, such as a Bluetooth® transceiver, for communicating with a mobile computing device, such as a smartphone or tablet. The wireless transceiver(s) 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication system 100 also includes a satellite network 260 comprising a plurality of satellites. The processing system 115 may use signals received from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

Figure 2:
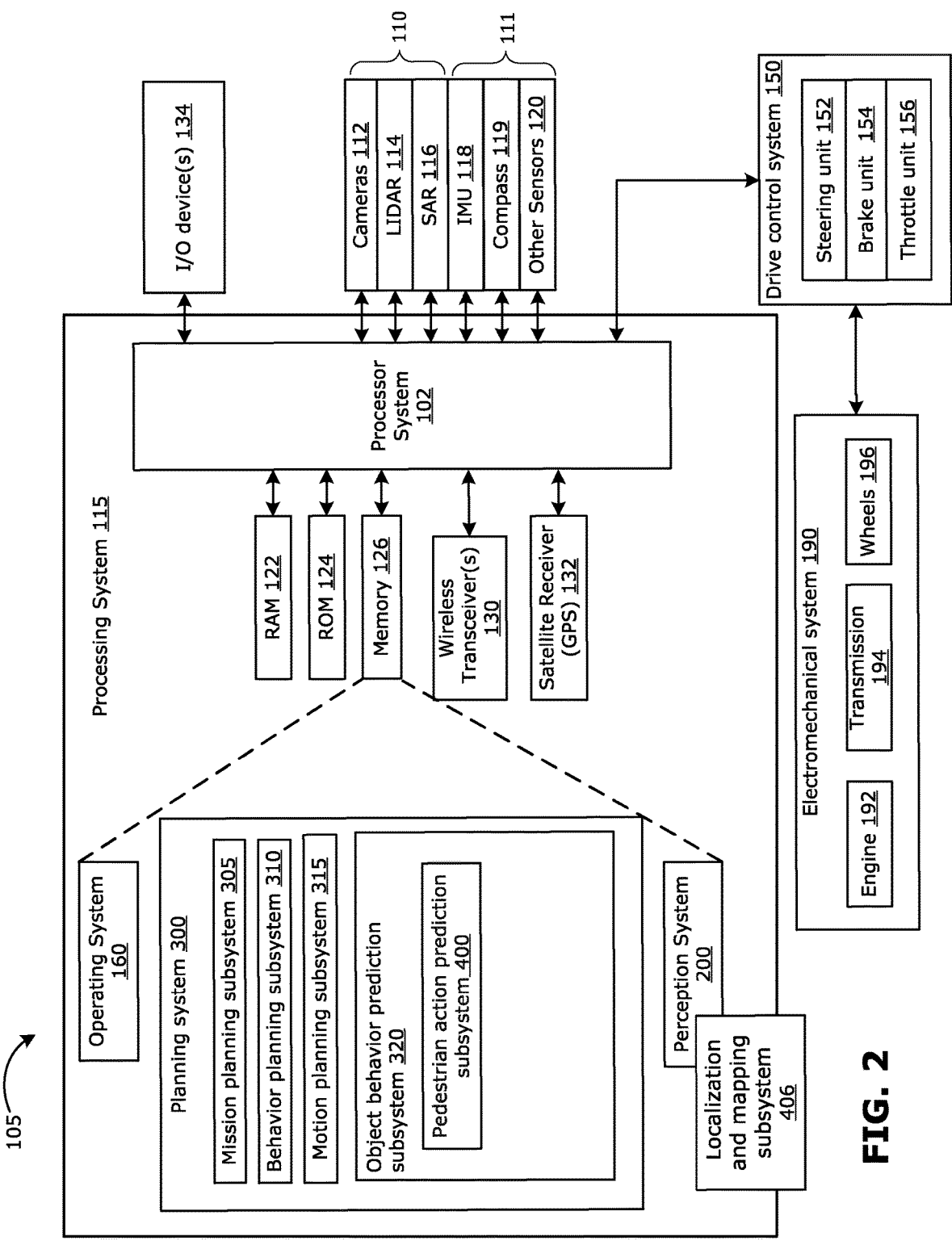
FIG. 2 is a block diagram illustrating some example components of an autonomous vehicle, in accordance with some embodiments of the present disclosure.

FIG. 2 illustrates selected components of the vehicle 105 in accordance with some examples described herein. The vehicle 105 includes a vehicle control system 115 that is coupled to a drive control system 150 and an electromechanical system 190. The vehicle control system 115 is also coupled to receive data from the environment sensors 110 and the vehicle sensors 111.

The environment sensors 110 may, for example, include one or more camera units 112, one or more light detection and ranging (LIDAR) units 114, and one or more radar units such as synthetic aperture radar (SAR) units 116, among other possibilities. Each type of sensor unit 112, 114, 116, may collect respective different information about the environment 100 external to the vehicle 105, and may provide sensor data to the vehicle control system 115 in respectively different formats. For example, a camera unit 112 may provide camera data representative of a digital image, a LIDAR unit 114 may provide a two or three-dimensional point cloud, and the SAR unit may provide radar data representative of a radar image.

The vehicle sensors 111 may include, for example, an inertial measurement unit (IMU) 118 that senses the vehicle's 105 specific force and angular rate and that provides data about an orientation of the vehicle based on the sensed specific force and angular rate. The vehicle sensors 111 may also include an electronic compass 119, and other vehicle sensors 120 such as a speedometer, a tachometer, wheel traction sensor, transmission gear sensor, throttle and brake position sensors, and steering angle sensor.

The vehicle control system 115 may also collect information about a position of the vehicle 105 using signals received from the satellite network 260, via a satellite receiver 132 and generate positioning data representative of the position of the vehicle 105.

The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to the drive control system 150, a Random Access Memory (RAM) 122, a Read Only Memory (ROM) 124, a persistent (non-volatile) memory 126 such as flash erasable programmable read only memory (EPROM) (flash memory), the wireless transceiver(s) 130, the satellite receiver 132, and one or more input/output (I/O) devices 134 (e.g., touchscreen, speaker, microphone, display screen, mechanical buttons, etc.). The processor system 102 may include one or more processing units, including for example one or more central processing units (CPUs), one or more graphical processing units (GPUs), one or more tensor processing units (TPUs), and other processing units.

The drive control system 150 provides control signals to the electromechanical system 190 to effect physical control of the vehicle 105. When in fully or semi-autonomous driving mode, for example, the drive control system 150 receives a planned action (as discussed further below) from the vehicle control system 115 and translates the planned action into control signals using a steering unit 152, a brake unit 154 and a throttle (or acceleration) unit 156. Each unit 152, 154, 156 may be implemented as software module(s) or control block(s) within the drive control system 150. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

The memory 126 of the processing system 115 has stored thereon software instructions that are executable by the processor system 102. The software instructions may be executed by the processor system 102 to implement one or more software systems, software subsystems, and software modules. Generally, it should be understood that software systems, software subsystems, and software modules disclosed herein may be implemented as a set of instructions stored in the memory 126. For example, the memory 126 may include executable instructions for implementing an operating system 160, a perception system 200, and a planning system 300 (also referred to as a path planning system). The perception system 200 and the planning system 300 may be part of an ADS (not shown) of the vehicle 105. The planning system 300 may be a machine-learning based system that generates a planned path (which may include planned sub-paths and planned behaviors) to be executed by the vehicle 105. The planning system 300 includes a mission planning subsystem 305, a behavior planning subsystem 310, a motion planning subsystem 315, and an object behavior prediction subsystem 320. The object behavior prediction subsystem 320 further includes a pedestrian action prediction subsystem 400. Details of the pedestrian crossing action subsystem 400 will be provided further below.

Planning and decision making by the planning system 300 may be dynamic, and be repeatedly performed as the environment changes. Changes in the environment may be due to movement of the vehicle 105 (e.g., vehicle 105 approaches a newly-detected obstacle) as well as due to the dynamic nature of the environment (e.g., moving pedestrians and other moving vehicles).

The planning subsystems 305, 310, 315 perform planning at different levels of detail. Mission level planning by the mission planning subsystem 305 is considered to be a higher (or more global) level of planning, motion level planning by the motion planning subsystem 315 is considered to be a lower (or more localized) level of planning, and behavior level planning by the behavior planning subsystem 310 is considered to be a level of planning between mission and motion level. Generally, the output from a higher level planning subsystem may form at least part of the input to a lower level planning subsystem.

Planning by the mission planning subsystem 305 (more simply referred to as mission planning) relates to planning a path for the vehicle 105 at a high, or global, level, for example planning a travel route from a starting point (e.g., a home address) to a final destination point (e.g., a work address). The behavior planning subsystem 310 may receive a planned route from the mission planning subsystem 305. The behavior planning subsystem 310 relates to controlling the behavior of the vehicle 105 on a more localized and short-term basis than the mission planning subsystem 305. The behavior planning subsystem 310 may generate a behavior decision that is in accordance with certain rules (e.g., traffic rules, such as speed limit or signage) or guidance (e.g., guidance for smooth and efficient driving, such as taking a faster lane if possible). The behavior decision may be provided as part of the input to the motion planning subsystem 315. The motion planning subsystem 315 relates to controlling the motion of the vehicle 105 based on its immediate environment 100. The motion planning subsystem 315 generates planning vehicle motion to ensure safety of the vehicle occupants and other objects (e.g., pedestrians, other vehicles, bicyclists, etc.) in the environment. Because the environment may be highly dynamic (e.g., pedestrians and other vehicles are all moving), the motion planning subsystem 315 should perform motion planning that is able to account for expected (or predicted) changes in the environment 100.

Sensor data received from the environment sensors 110 and vehicle data received from the vehicle control sensors 111 (and optionally also positioning data collected from the satellite network 260) may be used by a perception system 200 to generate processed data (e.g., observed frames, feature vectors, occupancy grid maps (OGMs), object classifications and bounding boxes, etc.) representing features of the environment 100 for each time step. The perception system 200 may include one or more machine-learning based system (e.g., trained neural networks) that generate processed data that represent features of the environment 100 for each time step.

The perception system 200 may include any number of independent or interconnected systems or functions, and may, for example, include rules-based systems, machine learning based systems, and combinations thereof. Machine learning based systems may be implemented using neural networks, such as any type of DNN (including CNNs or RNNs), long-short term memory networks, etc. In some examples, the perception system 200 can include a fusion subsystem for fusing sensor data and vehicle data from multiple environment sensors 110 and vehicle sensors 111 to generate fused data; a classification subsystem configured for processing the sensor data or the fused data to detect and identify objects in the environment 100 (e.g., to detect and identify a stationary obstacle, or a pedestrian or another vehicle, lanes and lane boundaries, and traffic lights/signs, among other things); and a localization and mapping subsystem 406 for constructing or updating a map of the environment 100 and estimating a position of the vehicle 105 within the map. In example embodiments, the localization and mapping subsystem of the perception system 200 is configured to generate, in real-time, birds-eye-view (BEV) maps (also referred to top-down view maps) that represent observed scenes in the vicinity of vehicle 105 from a 2-dimensional birds eye perspective. In example embodiments, BEV maps can be generated based on a combination of rasterized high definition (HD) top-down maps of the surrounding environment with the results of dynamic object detection performed by the classification subsystem of the perception system 200. In at least some examples, information from sensors external to the vehicle 105, for example pole mounted cameras, may be received through the wireless transceiver 130 of processing system 115 and incorporated into BEV mapping. In example embodiments, a respective 2D BEV map of the environment 100 is generated for each time step in a series of time steps. Each 2D BEV map can correspond to an observed frame of the environment.

The memory 126 may also have stored thereon instructions for implementing other software systems, subsystems, and modules, for example a navigation system, a climate control system, a media player system, a telephone system and/or a messaging system, among others.

Figure 3:
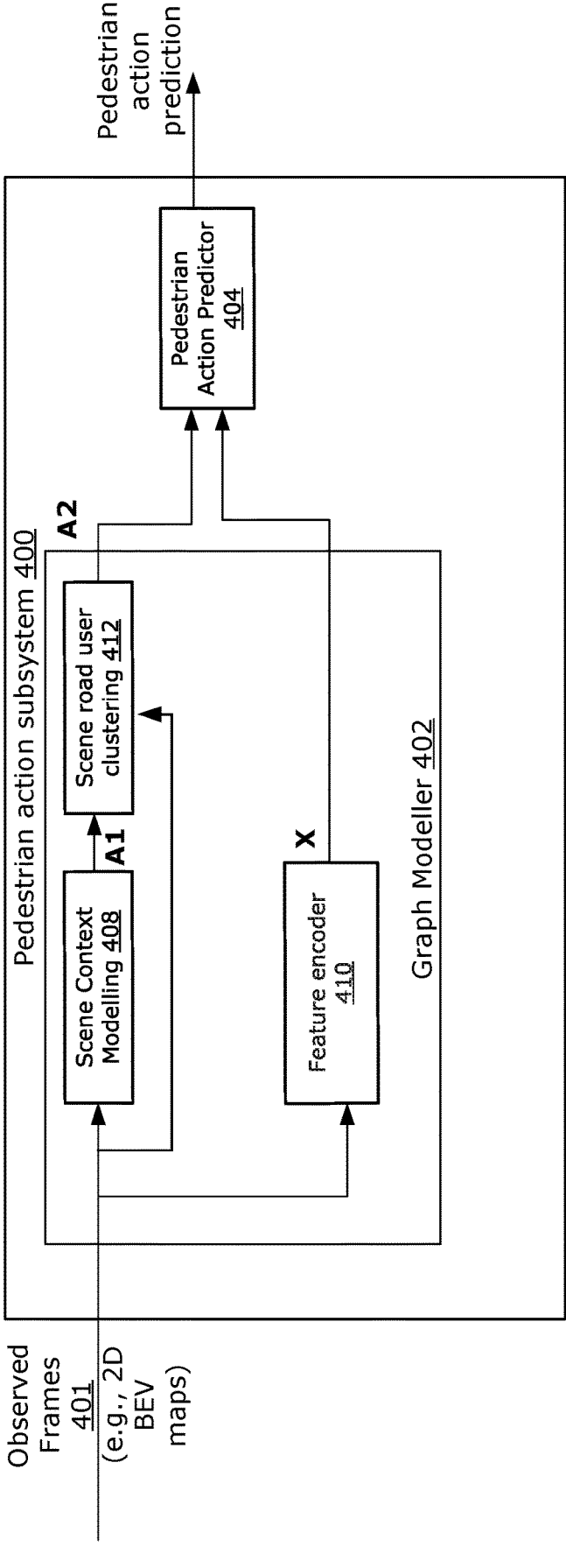
FIG. 3 is a block diagram showing an example subsystem for pedestrian crossing action prediction, in accordance with some embodiments of the present disclosure.

FIG. 3 is a block diagram illustrating example details of the pedestrian action prediction subsystem 400. The pedestrian action prediction subsystem 400 may be a subsystem of the object behavior prediction subsystem 320 (which in turn may be a subsystem of the planning system 300). However, it should be understood that the pedestrian action prediction subsystem 400 may also be used outside of the object behavior prediction subsystem 320, outside of the planning system 300, and/or outside of the ADS (not shown) of the autonomous vehicle 105. For example, the pedestrian action prediction subsystem 400 may be applicable in any computing system in which predicting a pedestrian action (i.e. an action of a pedestrian) would be useful (e.g., assistive robotics, intelligent traffic management, among others).

The pedestrian action prediction subsystem 400 subsystem includes a graph modeller 402 and a pedestrian action predictor 404. The graph modeller 402 includes a scene context modelling module 408, a feature encoder 410, and a scene road user clustering module 412. The graph modeller 402 receives processed data, representing features of the environment 100, for each time step in a predetermined time period from the perception system 200 of the vehicle 105. In some examples, the processed data comprises for each respective time step, an observed frame 401 (i.e. an observed scene). In some examples, each observed frame 401 can take the form of a 2D bird's eye view (BEV) map of the environment 100. As noted above, time-step 2D BEV maps can be generated by the localization and mapping subsystem 406 of perception system 200. In some examples, some or all of the functionality of localization and mapping subsystem 406 may be incorporated into a preprocessor module that may be added to a front-end of the graph modeller 402. Each observed frame 401 includes metadata that classifies the respective objects represented in the observed frame (e.g., pedestrian, vehicle, bicycle) as well as spatial information. In this regard, the observed frame 401 includes spatial information about a target pedestrian (i.e. the pedestrian for which a pedestrian action is to be predicted) and spatial information about other dynamic objects that surround the target pedestrian in the environment 100. In this disclosure, dynamic objects other than the target pedestrian that can potentially interaction with the pedestrian are referred to as road users, and can include motor vehicles, self-propelled vehicles such as pedal bicycles, pedestrians, animals, and the like. The spatial information includes information that allows the relative locations of the target pedestrian and the road users to be determined from a single observed frame 401, and direction of movement of the target pedestrian and the road users to be determined based on a temporal sequence of observed frames 401.

Scene Context Modelling Module

The scene context modelling module 408 receives the observed frames 401, determines, for each respective observed frame 401, the location of the target pedestrian and the location of each road user, and generates a spatial graph G=(V,E) (where V is a set of nodes v, and E is a set of connecting edges e) for the respective observed frame 401 and a corresponding adjacency matrix $A_1$ for the spatial graph G for the respective observed frame 401. The nodes V of the spatial graph G generated for each respective frame includes a central node ($v^P$) that represents the target pedestrian and a plurality of other nodes ($v^{ru}$) where each of the other nodes ($v^{ru}$) represents one of the road users. The respective connecting edges e in the spatial graph for each observed frame represent direct connections between the central node $v^P$ and each of the other nodes $v^{ru}$. The adjacency matrix $A_1$ includes multiple elements, where each element of the adjacency matrix $A_1$ includes a weight assigned to a direct connection (e.g., an edge e) between the target pedestrian (represented by the central node $v^P$ of the spatial graph G) and one of the road users (represented by one of the other nodes $v^{ru}$ of the spatial graph).

Figure 4:
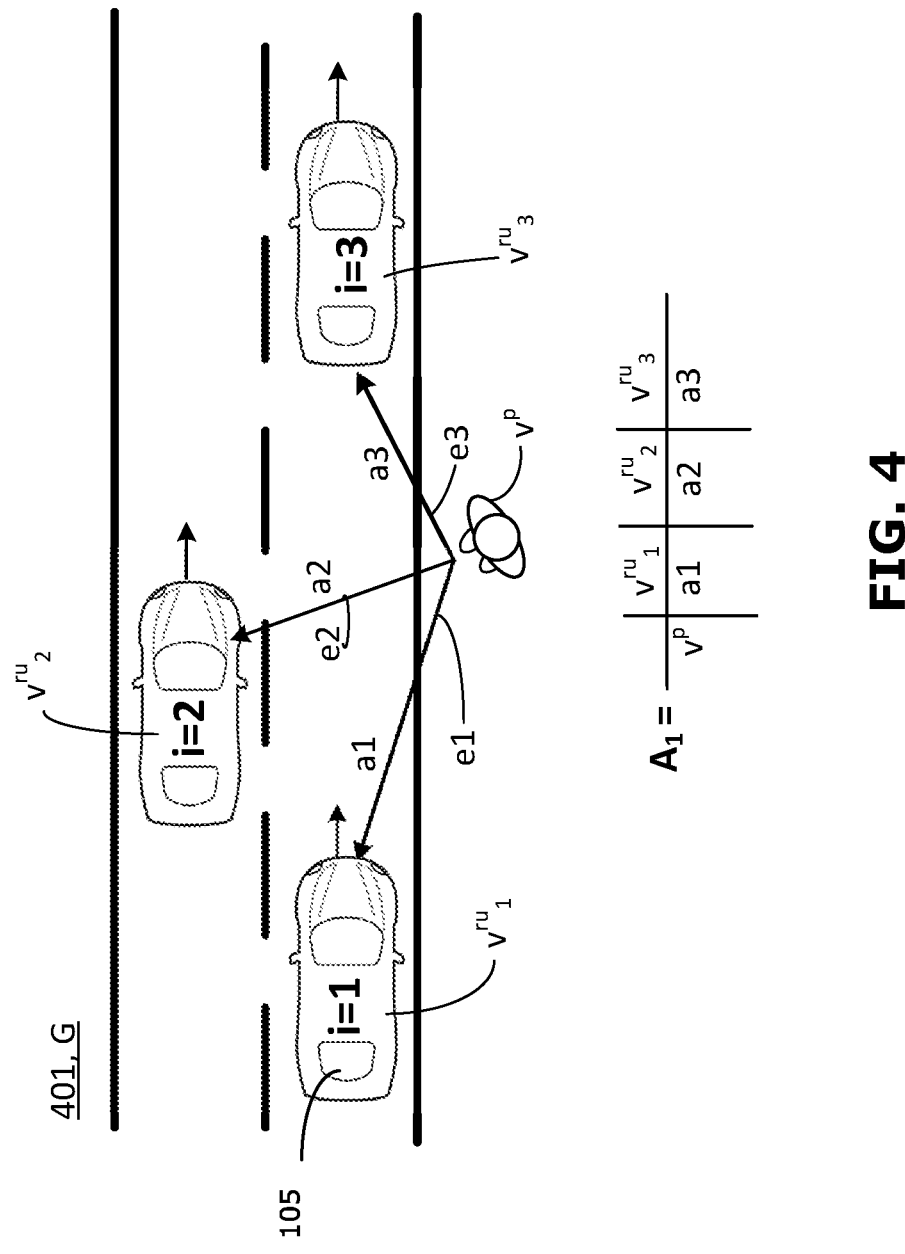
FIG. 4 illustrates an example of an observed frame overlaid with a representative spatial graph frame scene that can be modelled by the subsystem for pedestrian crossing action prediction, in accordance with some embodiments of the present disclosure.

An illustrative example of an observed frame 401 and its respective spatial graph G is illustrated in FIG. 4. In FIG. 4, the observed frame 401 corresponds to a 2D BEV map that includes detected objects representing three vehicles (road users) and a target pedestrian positioned on or near a road. By way of example, the observed frame 401 may have been generated by the perception system of an ego vehicle 105. Scene context modelling module 408 generates respective spatial graph G (which for illustrative purposes is overlaid on observed frame 401 in FIG. 4) and adjacency matrix $A_1$ based on the spatial information represented in observed frame 401. In particular, the target pedestrian is represented as central node $v^P$ and the respective vehicles are represented as road user nodes $v^{ru}_1$, $v^{ru}_2$, $v^{ru}_3$. The connecting edges e1, e2, e3 represent direct connections between the central target pedestrian node $v^P$ and each of the respective road user nodes $v^{ru}_1$, $v^{ru}_2$, $v^{ru}_3$. The respective lengths of the connecting edges e1, e2, e3 are representative of the real-world distance between the target pedestrian and each of the respective road users, and these inter-node distances are one of a plurality factors used by the scene context modelling module 408 to determine a respective multi-factor importance weight (e.g., a1, a2, a3) in adjacency matrix $A_1$.

The multi-factor importance weight (e.g., a1, a2, a3) assigned by the scene context modelling module 408 to each direct connection (e.g., connecting edges e1, e2, e3) in the spatial graph G represents a relative importance of each road user to the target pedestrian. In examples, the scene context modelling module 408 assigns a higher weight $a_i$ to direct connections (i.e., connecting edges $e_i$) for road users that are both close to the target pedestrian but are also at a relatively important location with respect to the target pedestrian in the observed frame 401. In some embodiments, a multi-factor importance weight $a_i$ assigned by the scene context modelling module 408 to each direct connection $e_i$ in the spatial graph G is determined based on: (i) a distance between the road user and the target pedestrian, and (ii) a relative location of the road user and the target pedestrian. In some embodiments, the multi-factor importance weight $a_i$ assigned by the scene context modelling module 408 to each direct connection $e_i$ in the spatial graph G is determined as follows.

For the target pedestrian, the distance from the target pedestrian to each road user around the target pedestrian in the observed 401 frame is determined. A road user may be another pedestrian, a bicycle, or another vehicle. The distance from the target pedestrian to the road users is represented by a vector D={d1, d2, . . . , $d_i$ . . . , dN} where N is the number of road users and the $i_{th}$ element shows the distance of the road user i (represented in spatial graph G as road user node $v^{ru}_i$) with respect to the target pedestrian (represented in spatial graph G as target pedestrian node $v^P$). The vector D is then normalized by a value dmax, which is the farthest distance considered (e.g., as represented by the longest connecting edge e) when predicting the target pedestrians' action. The farther a road user is to the target pedestrian, the closer its corresponding normalized distance is to 1. In some embodiments, (1-D) may be used as a first importance weight (hereinafter referred to as a "distance importance weight") for each road user surrounding the target pedestrian.

The scene context modelling module 408 also models the relative directional locations of each road user around the target pedestrian when assigning the multi-factor importance weight $a_i$ representative of the importance of each road user i to the target pedestrian. The scene context modelling module 408 assigns a second importance weight, namely a relative location importance weight $b_i$, to each respective road user i surrounding the target pedestrian based on the respective road user's relative location with respect to the target pedestrian.

Figures 5, 6:
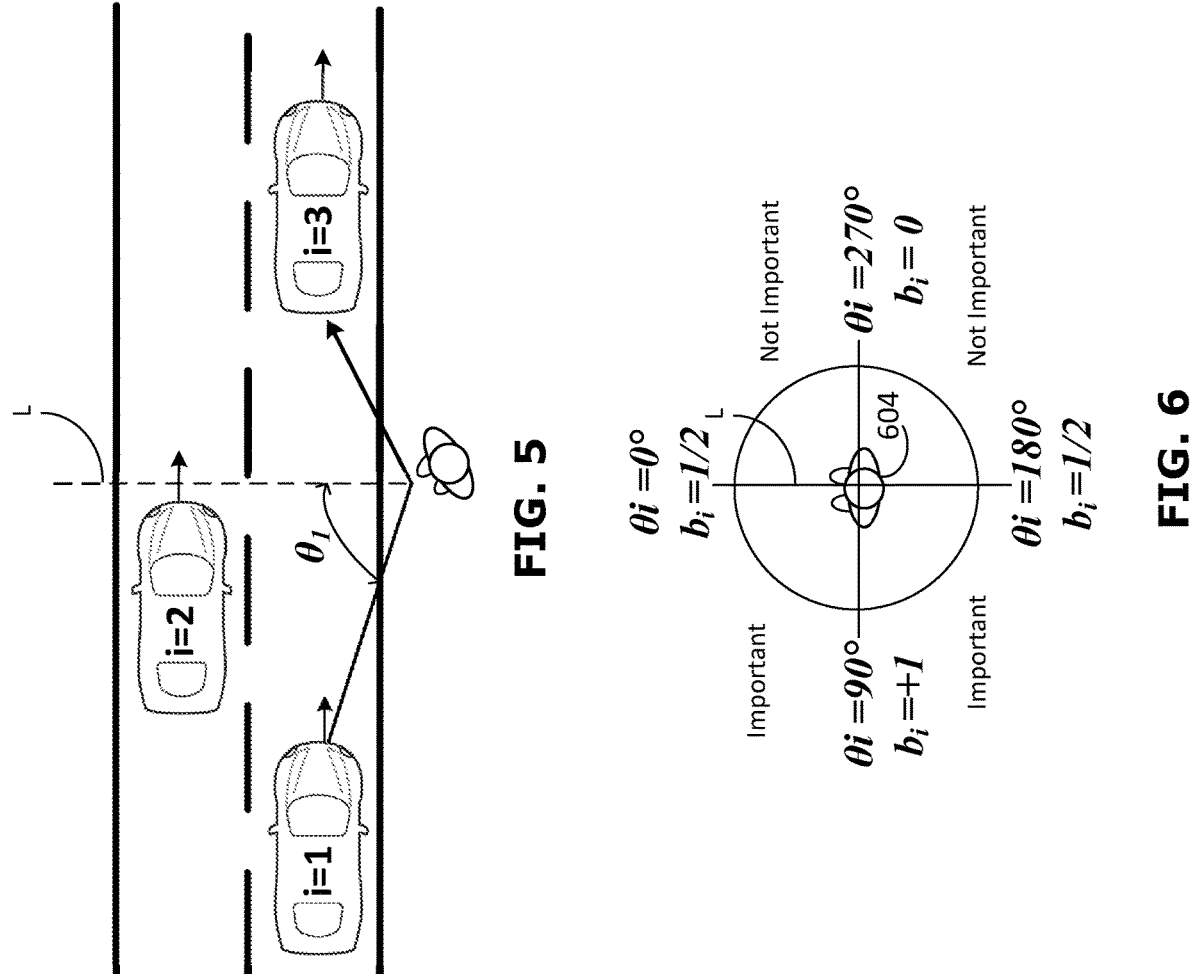
FIG. 5 shows a the observed frame of FIG. 4 with a perpendicular reference line drawn from a target pedestrian.
FIG. 6 illustrates an example of directional weight values around a target pedestrian.

With reference to FIG. 5, in some embodiments, a relative location importance weight $b_i$ is assigned based on angular position of the connecting edge $e_i$ between road user i and the target pedestrian to a reference line L drawn from the location of target pedestrian in a direction perpendicular to the road (e.g., perpendicular to the legal direction of travel of road users on the lane of the road lane nearest the target pedestrian). The counter clockwise angle θi between the perpendicular reference line L and the connecting edge $e_i$ between the target pedestrian and each respective road user i is measured for each of the N road users around the target pedestrian (i.e., target pedestrian is the center or origin point of referene line L). For every road user i, the angle θi, as measured counter-clockwise from reference line L, will be between 0 and 360 degrees. In one example, the scene context modelling module 408 defines the relative location importance weight $b_i$ of the road user i to the target pedestrian as:

$$b_i = \frac{(1 + \sin(\theta i))}{2} \qquad \text{(Eq. 1)}$$

The scene context modelling module 408 generates a relative location importance weight vector B={b1, b2, . . . , bi . . . , bN} in which the ith element (e.g., $b_i$) of the vector B indicates the relative location importance of the road user i with respect to the target pedestrian. It will be noted that Equation 1 determines the relative location importance weight $b_i$ as a continuous variable that is assigned to a road user i based on a relative directional location of the road user i. FIG. 6 indicates relative location importance weights $b_i$ calculated at angles θi=90 degrees, 180 degrees, 270 degrees and 0 degrees relative to perpendicular reference line L, with target pedestrian 606 at the origin point of the reference line L. In the case where the pedestrian 604 is facing the road, the following relative location importance weights will be assigned to the objects in front, back, left and right of the target pedestrian: front=½; back=½; left=+1; right=0.

As illustrated above, the scene context modelling module 408 assigns less relative location importance weight to the road users whose location is on the right side of the target pedestrian, and assigns more location relative importance weight to the road users on the left side of the target pedestrian. More particularly, road users whose location is on the right side of the reference line L are assigned lower relative location importance weights than the road users on the left side of the target pedestrian. Such relative weighting may for example be appropriate for jurisdictions such as the United States and mainland China where right-hand road side driving is legally mandated.

In some other embodiments, rather than continuous values, discrete values may be assigned to represent relative location importance, For example, in the case of FIG. 6, road users at relative locations associated with 0 degrees<=θi<=180 degrees to perpendicular reference line L can be deemed as important and assigned a relative location importance weight $b_i$=1 and road users at relative locations associated with 180 degrees<θi<360 degrees to perpendicular reference line L can be deemed as not important and assigned a relative location importance weight $b_i$=0. However, the use of a continuous weight is more accurate.

The relative location importance weight computation methods described above are illustrative; any formulation that assigns importance weights that reflect expected road user behavior to surrounding road users could be used for the weight assignment in vector B.

When the scene context modelling module 408 has computed both the distance importance vector D and relative location importance weight vector B, a final multi-factor importance weight $a_i$ is assigned to every road user as:

$$A = B \cdot (1 - D)$$

where · denotes element-wise multiplication of the vectors. The $i^{th}$ element of the vector A={a1, a2, . . . , $a_i$, . . . , aN} is the relative importance of ith road user with respect to the target pedestrian. If the multi-factor importance weight $a_i$ assigned to a road user i is close to 0, the road user i is either far from the target pedestrian or is on the right side of the target pedestrian.

Accordingly, the spatial graph G is a star-shaped graph centered at the target pedestrian. A center node of the star-shaped graph represents the target pedestrian and each other node in the star-shaped graph represents a road user. Direct connections in the star shaped graph connect each road user to the target pedestrian. The relative distances and directional locations of the user nodes with respect to the target pedestrian are factored into the corresponding edge weights, as reflected in adjacency matrix A.

Feature Encoder

The feature encoder 410 receives, from the preprocessing module 404, the spatial information for each observed frame 401, generates spatiotemporal information about the target pedestrian based the spatial information about the target pedestrian in the set of observed frames 401, and generates spatiotemporal information about each respective road user based on the spatial information about the respective road user in the set of observed frames. The feature encoder 410 also generates a feature encoding $x^p$ for the target pedestrian which encodes the generated spatiotemporal information for target pedestrian. The feature encoding $x^p$ of the target pedestrian may be in the form of a vector. The respective features that are encoded as respective elements in feature encoding $x^p$ based on the spatiotemporal information about the target pedestrian may include one or more of: a location of the target pedestrian, a size of the target pedestrian, a velocity of the target pedestrian a direction of movement of the road user, and a distance from the target pedestrian to a boundary of a road the vehicle 105 is operating on.

The feature encoder 410 also generates a feature encoding $x^{ru}_i$, for each road user i. The feature encoding $x^{ru}_i$, for each road user i encodes the generated spatiotemporal information about the road user. The feature encoding $x^{ru}_i$ of each road user i may be in the form a vector. The respective features that are encoded as respective elements in feature encoding $x^{ru}_i$ based on the spatiotemporal information about each respective road user i may include one or more of a location of the respective road user relative to the target pedestrian, a size and/or type of the respective road user (e.g., car, bus, bicycle, other pedestrian), a velocity of the respective road user, a direction of movement of the respective road user, and a distance from the respective road user to a boundary of a road the vehicle 105 is operating on, and a velocity of the road user. Accordingly, feature encoder 410 generates a feature matrix X of feature vectors {$x^p$, $x^{ru}_1$, . . . , $x^{ru}_N$}. Feature encoder 410 may use historic information from preceding observed frames 401 to determine the feature matrix X in respect of a current observed frame.

Scene Road User Clustering Module

In examples where the graph modeller 402 includes a scene road user clustering module 412, the scene road user clustering module 412 is configured to identify the road users that have similar behaviors and incorporates their similarities into the spatial graph G generated for each observed frame 401. The scene road user clustering model 412 clusters the road users with similar behaviors into the same group. The scene road user clustering model 412 utilizes some criteria for deciding whether some road users are similar in their behavior or not. In order to cluster objects into groups, the scene road user clustering module 412 can perform clustering operations according to a clustering criteria or model and based on information derived from both the current time-step and historic observed frames 401, for example as follows:

(1) Split road users into different groups based on their types and motion: stationary pedestrian, moving pedestrian, stationary vehicle, moving vehicle, stationary bicycle, moving bicycle.

(2) Further cluster non-pedestrian road users within the different groups (e.g., powered vehicles and bicycles) based on their orientation by: (a) determining orientation vectors based on annotations; (b) using KMEANs algorithm to split the orientation vectors into two sub-groups (e.g. clusters), one sub-group for each driving direction; and (3) splitting the sub-groups (e.g. clusters) from step (2)(b) into further sub-groups (e.g. sub-clusters) based on the orientation vectors.

(3) Further cluster pedestrian road users into sub-groups (e.g., clusters) based on based on their orientation. If pedestrians are standing still, then no further dividing pedestrians into further sub-groups (e.g., sub-clusters) is required. If pedestrians are moving, split the pedestrian clusters from step (3) based on orientation and/or motion of the pedestrians. If any two pedestrians are oriented in the same direction, group the two pedestrians into the same cluster. If any two pedestrians are oriented in different direction and walking towards each other, group the two pedestrians in the same cluster. If any two pedestrians are oriented in opposite directions and walking away from each other, place the two pedestrians into two sub-clusters. In some examples, determining whether two pedestrians are walking in the same direction or not can be performed by determining the angle between their moving/standing directions and if the angle is less than 90 degrees, the two pedestrians are determined to be moving in the same direction. Otherwise, the two pedestrians are determined to be moving in different directions.

Clustering is completed when the smallest possible clusters have been obtained according to predetermined clustering criteria or model.

After the clusters are obtained, the spatial graph G for each observed frame is modified to include an edge connection between r nodes that represent road users and that are included in the same group (cluster). The final spatial graph G for each observed frame will include a star-shaped graph with the center node representing the target pedestrian for which pedestrian action prediction is being performed with the other nodes that represent road users within a cluster being fully connected to each other. The fully connected other nodes are of the same type (powered vehicle, pedestrian, bicycle, etc.) which have been determined to have similar behavior.

Figure 7:
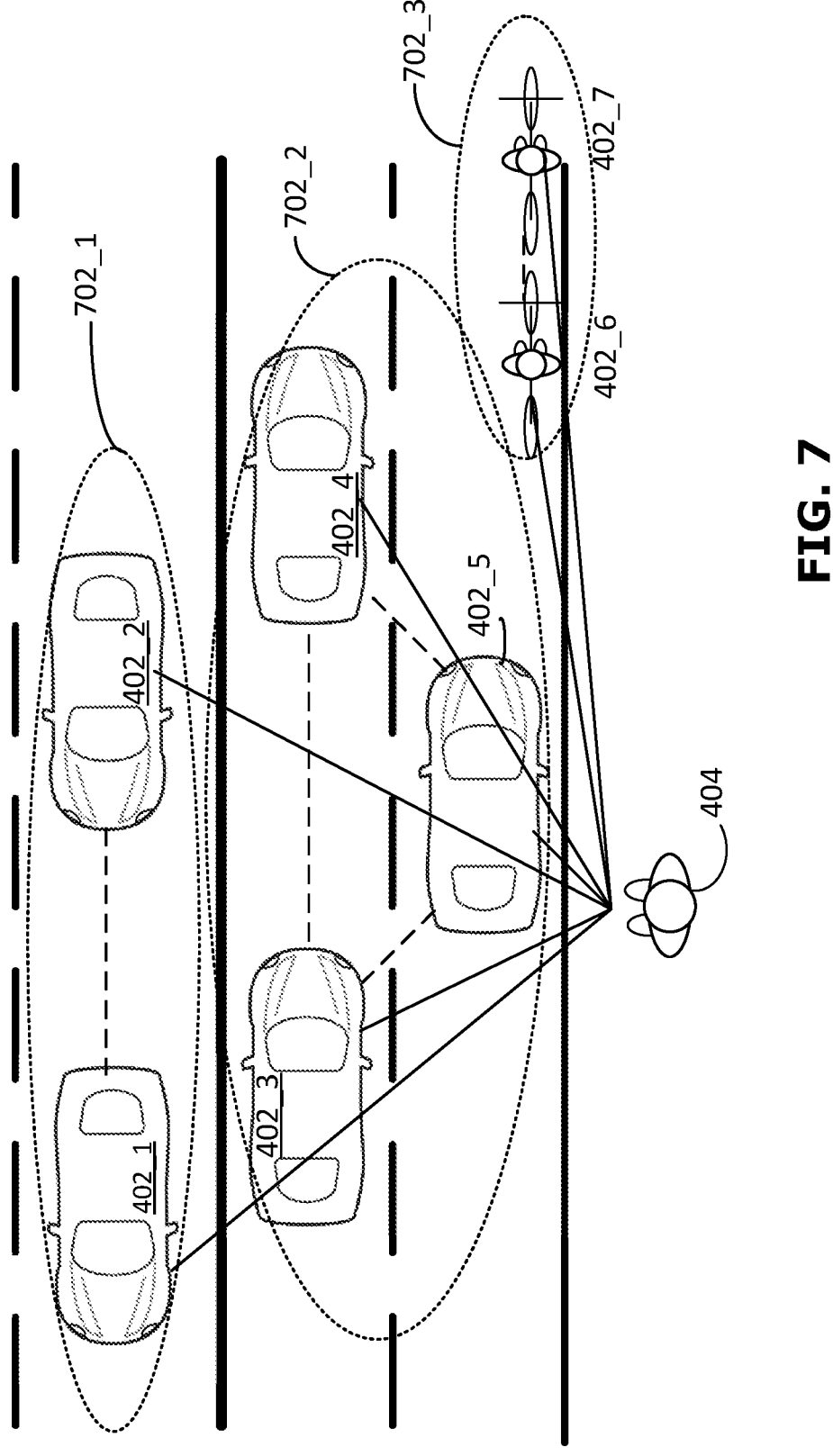
FIG. 7 is a second example of an observed frame and with an overlaid spatial graph data.

For example, in FIG. 7, the road users in the same ellipsoid are in the same cluster (e.g., powered vehicle type road users 402_1 and 402_2 in ellipsoid 702_1 are in a first common cluster; powered vehicle type road users 402_3 to 402_5 in ellipsoid 702_2 are in a second common cluster; and bicycle-type road users 402_6 and 402_7 in ellipsoid 702_3 are in third common cluster. The road user nodes $v^{ru}$ within each respective cluster will each be connected by a respective connecting edge, thus adding a further set of connecting edges to the spatial graph G. In FIG. 7, solid lines between the pedestrian 404 and respective road users 402_1 to 407_7 represent the original connecting edges determined by scene context modelling module 408. The dashed lines connecting the respective road users within each cluster (i.e., within each ellipsoid 702_1, 702_3 and 702_3) represent the intra-cluster connecting edges that are added in scene road clustering module 412.

In example embodiments, the intra-cluster connecting edges each have a weight of 1. Adjacency matrix A1 can be expanded to include elements that represent the intra-cluster connecting edges, resulting in a comprehensive adjacency matrix A2. An example of adjacency matrix A2 that corresponds to FIG. 7 is shown in FIG. 8, where $v^p$ denotes a central node representing target pedestrian 404, and $v^{ru}_1$ to $v^{ru}_7$ denote road user nodes that represent road users 402_1 to 402_7, respectively.

Advantageously, the scene road user clustering module 412 generates spatial graphs of observed frames that include a better understanding of the observed frames (i.e. traffic scene). The spatial graphs for each observed frame are provided as a spatiotemporal graph to the pedestrian action predictor 404 as described below which predicts a future pedestrian action for the target pedestrian.

Pedestrian Action Predictor

The pedestrian action predictor 404 receives the spatial graphs for the set of observed frame and processes the spatial graphs using a spatiotemporal graph convolutional neural network (GCNN) to predict a pedestrian action for the target pedestrian. In particular, the pedestrian action predictor 404 receives as inputs the feature matrix X, which includes respective feature vector encoding for the target pedestrian and each of N road users, along with adjacency matrix A2, which identifies a relative importance weighting a1 to aN between the target pedestrian and each of N road users, and also identifies respective clusters of similar behaved road users. The GCNN generates a probability value for the pedestrian action that corresponds to the pedestrian will cross the road and a probability value for the pedestrian action that corresponds to the pedestrian will not cross the road, and outputs a binary value that represents a prediction of whether the pedestrian action (will cross or not). For example, if the generated probability value for the pedestrian action that corresponds to the pedestrian will cross is higher than the probability value for the pedestrian action that corresponds to the pedestrian will not cross, the pedestrian action predictor 404 outputs an indication (i.e. a label) that the pedestrian action is the pedestrian will cross. Similarly, for example, if the generated probability value for the pedestrian action that corresponds to the pedestrian will cross is lower than the probability value for the pedestrian action that corresponds to the pedestrian will not cross, the pedestrian action predictor 404 outputs an indication (i.e. a label) that the pedestrian action is the pedestrian will not cross.

Based on the predictions generated, the planning system 300 of ego vehicle 105 can determine an appropriate action that should be taken by one or more systems of the ego vehicle 105. For example, the planning system 300 may issue an instruction to the drive control system 150 to cause brake unit 154 to cause the ego vehicle 105 to decelerate.

Other actions that may be instructed include: change steering angle; increase or decrease throttle; sound horn; and activate an internal warning (sound and/or visual and/or tactile alert) in the vehicle cabin.

Accordingly, in examples, the pedestrian action subsystem 400 applies a graph-based interaction modelling approach which takes road user bird's-eye-view information as input. Importance weights are assigned to different road users based on both their distance and their relative location with respect to a pedestrian.

Figure 9:
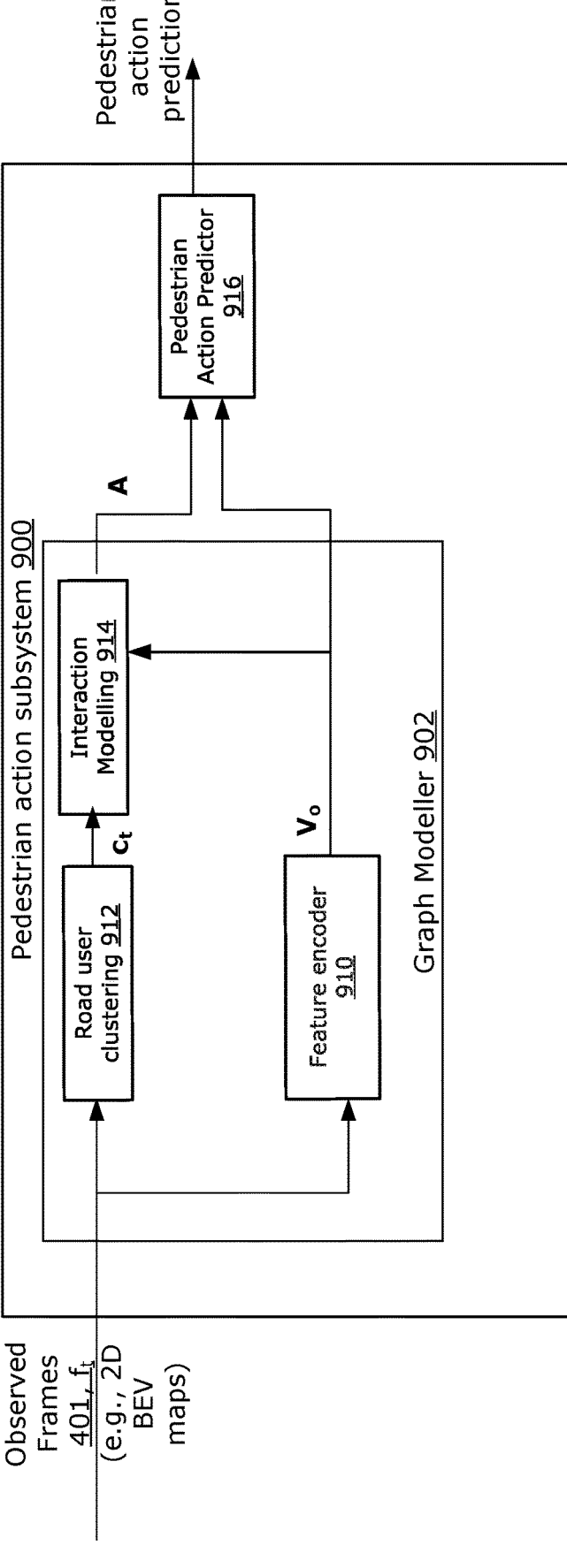
FIG. 9 is a block diagram showing an example of a further subsystem for pedestrian crossing action prediction, in accordance with some embodiments of the present disclosure.

As shown in FIG. 9, an example of a further pedestrian action prediction subsystem 900 will now be described according to a further example aspect of the disclosure.

In pedestrian action prediction subsystem 900, pedestrian action prediction is considered as an optimization problem. The goal is to estimate the probability distribution of crossing action, $p(Y_{t+k}^{(i)} | L_0, O_0, R_0) \in [0,1]$, where $Y_{t+k}^{(i)} \in \{0,1\}$, for the $i^{th}$ pedestrian at some time t+k in the future, given an observed sequence of global bird's-eye-view locations $L_o = \{l_1, l_2, \ldots, l_T\}$ and orientations $O_o = \{o_1, o_2, \ldots, o_T\}$ of the target pedestrian, ego-vehicle 105, and nearby road users, along with traffic directions of the road $R_o = \{r_1, r_2, \ldots, r_T\}$.

Similar to action prediction subsystem 400, the action prediction subsystem 900 includes a graph modeler 902 and pedestrian action predictor 916.

The graph modeler 902 includes: (i) a road user clustering module 912 that is configured to group road users near the target pedestrian using their speed, location, and orientation; (ii) a feature encoder module 910 that is configured to form a vector of features for each observed object (e.g., road users included in the observed frames 401) and the target pedestrian. The vectors are used as node representations of a road users and the target pedestrian in spatial graph G. The graph modeler 902 also includes (iii) an interaction modelling module 914 that is configured to compute the relative importance of road users to the target pedestrian, which is used along with identified clusters to determine weighting for connecting edges in spatial graph G. The pedestrian action predictor 916 uses the graph representations of spatial graph G and some dynamics information of the target pedestrian and ego-vehicle to predict the probability of crossing action by the target pedestrian in the future.

Road User Clustering Module 912

In examples, road user clustering module 912 is configured to group road users based on similar behaviors. In this regard, road user clustering module 912 performs framewise clustering of the target pedestrian's surrounding road users based on their static and dynamic properties, including object type and speed, location, and orientation, as follows:

Object types. First, road users are separated into class types, for example three classes—pedestrians, vehicles, and bicycles. Road users are then further clustered within each class for every observed frame 401 in a sequence of observations $F_o = \{f_1, f_2, \ldots, f_T\}$, first based on speed $S_o = \{s_1, s_2, \ldots, s_T\}$, then bird's-eye-view locations $L_o$ and finally orientations $O_o$, in a hierarchical manner, obtaining a set of clusters for each observed frame, $C_o = \{c_1, c_2, \ldots, c_T\}$.

Object speed. Within each of the classes, a determination is made for each road user to determine if it is moving or stationary by calculating its speed between the previous and current frame. For the $i^{th}$ object in frame t, $$s_t^{(i)} = \frac{\|l_t^{(i)} - l_{t-1}^{(i)}\|}{\text{frame rate}}$$

where t=2 . . . T and frame rate is the frequency in Hz of the observed frames 401. At t=1, $s_1^{(i)}$ is set to 0.

Speed thresholds (for example of 0.2 m/s, 2 m/s, and 2 m/s), determined empirically, are used to split each object class into moving or stationary subgroups. If $s_t^{(i)} \geq$ threshold, road user i is considered moving in the observed frame $f_t$. Thus, using road user type and speed, all road users in an observed frame 401 are split in groups, for example six groups: stationary pedestrians, moving pedestrians, stationary vehicles, moving vehicles, stationary bicycles, and moving bicycles.

Locations. Next, coarse clusters are generated within each group of road users based on their distances from each other in the bird's-eye-view. For example, the Density-Based Spatial Clustering of Applications with Noise (DBSCAN) algorithm [See M. Ester, H.-P. Kriegel, J. Sander, and X. Xu, "A density-based algorithm for discovering clusters in large spatial databases with noise," in International Conference on Knowledge Discovery and Data Mining, 1996 can be used for this. DBSCAN requires two parameters—the maximum distance for two points to be considered in the same cluster, and MinPts, used to determine noise in clustering. MinPts can be set to 1 so that no object (e.g., road user) is identified as noise. In an illustrative examples, the maximum distances can be empirically set as 1.5, 10, and 5 meters for pedestrians, vehicles, and bicycles respectively Orientations. These distance-based clusters can be further split based on road users' orientation information. In an illustrative example, stationary pedestrians, no further clustering is done due to the highly variant nature of pedestrian orientations in stationary groups. With moving pedestrians, clustering is done based on two factors—1) whether two given pedestrians are facing in the same or different directions and 2) whether they are moving towards or away from each other. In this regard, two pedestrians can be considered as objects i and j, to be facing opposite directions in frame $f_t$ if the angle between their orientation vectors, $\gamma$, satisfies:

$$\gamma = \cos^{-1}\left(\frac{\vec{o}_t^{(i)} \cdot \vec{o}_t^{(j)}}{\left\|\vec{o}_t^{(i)}\right\|\left\|\vec{o}_t^{(j)}\right\|}\right) \geq 90°,$$

where $\vec{o}_t^{(i)}$ and $\vec{o}_t^{(j)}$ are orientation vectors for objects i and j, respectively. Otherwise, the pedestrians are deemed to be facing the same direction.

Two pedestrians are considered to be moving away from each other if the distance between them increases from observed frame $f_{t-1}$ to $f_t$. That is, if $\|l_t^{(i)} - l_t^{(j)}\| > \|l_{t-1}^{(i)} - l_{t-1}^{(j)}\|$. Otherwise, the pedestrians are considered to be moving towards each other. Two pedestrians are kept in the same distance cluster together if they are: 1) facing the same direction, or 2) facing opposite directions and moving towards each other. Two pedestrians from a distance cluster are separated into different clusters if they are facing opposite directions and moving away from each other.

For vehicle and bicycle clusters, road users can be split into two groups using, for example, a K-means algorithm [ ], clustering based on their normalized orientation vectors. The goal of doing this is to prevent vehicles and bicycles travelling in different directions to be placed in the same cluster.

As described below, the interaction modeling module 914 uses the set of clusters found in observed frame $f_t$, namely $c_t = \{c^{(1)}_t, c^{(2)}t, \ldots, c^{(NC,t)}\}$, where NC,t is the total number of clusters at observed frame $f_t$ for determining weights for graph edges.

Feature Encoder Module 910

The target pedestrian and each road user in the traffic scene represented in an observed frame $f_t$ is represented as a respective object node in the graph G for the given observed frame $f_t$. In one example, the node representation for the $i^{th}$ object in observed frame $f_t$, is represented as object node vector $v^{(i)}_t$. For example, the vector $v^{(i)}_t$ for an object (e.g., road user or target pedestrian) may include 35 elements that can be used for respective feature values that specify information including object type, location, motion, and size. In this regard, each road user and the target pedestrian is represented by a set of feature values that includes information beyond simply bird's-eye-view coordinates. By way of example, for each object, a set of seven elements out of the 35 elements of object node vector $v^{(i)}_t$ can be used to specify 7 feature values that directly pertain to the ith object. Of these seven feature values, the first two represent whether the object is stationary [1,0] or moving [0,1]. Including this information allows a spatial graph convolution operation to encode information on the ratio of stationary to moving road users' importance to the target pedestrian. The third and fourth feature value represent the object's location with respect to the target pedestrian. For the target pedestrian, these values will be [0,0]. Otherwise, for road user i, these values are $[x, y] = 1^{(i)}_t - 1^{(ped)}_t$. A threshold distance, for example $d_{thresh} = 20$ m, set empirically, can be defined around the target pedestrian, and the coordinates [x,y] adjusted to range from 0 to 1 using $$d = \frac{\min(d, d_{thresh})}{d_{thresh}}$$

where d is the distance of an road user to the target pedestrian along the global x or y axis. The fifth feature value is the speed $s_{r(i)}$ of the road user, as defined in the object speed Equation above. The sixth and seventh feature values are the object's length and width respectively. In some examples, the maximum values of the speed, length, and width for each object type (e.g., vehicle, bicycle, pedestrian) are determined during training of the prediction action subsystem 900, and these values are rescaled in the training set to range between 0 and 1. In this regard, scaling factors can be learned to scale feature values during system deployment to a similar range. After obtaining the seven feature value values for an object, specific elements of the object node vector $v^{(i)}_t$ are populated based on the object's type (ego-vehicle, target pedestrian, other pedestrians, other vehicles, and bicycles).

In example embodiments, different sections of element locations in object node vectors $v^{(i)}_t$ are assigned for different types of objects. For example, if the node represents the target pedestrian, the first seven element slots (e.g., a first section consisting of element locations 1 to 7) of node vector $v^{(i)}_t$ are populated respectively with the seven feature values. For a node vectors $v^{(i)}_t$ representing ego-vehicle 105, the next seven element slots (e.g., a second section consisting of element locations 8 to 14) are used for the feature values. For other pedestrians, other vehicles, and bicycles, the third, fourth, and fifth 7-element sections of node vectors $v^{(i)}_t$ are respectively used for the seven feature values. The purpose of separating the feature values of different object types is to help the model identify the types of objects surrounding the target pedestrian.

For N unique objects in a sequence of observed frames, the feature vectors are stacked into a matrix of size N×Q for each observed frame, where Q=is the length in element slots of node vectors $v^{(i)}_t$. (e.g., Q=35 in the illustrated example), resulting in a set feature matrices $v_o = \{V_1, V_2, \ldots, V_T\}$. T represents the total number of times steps (e.g., observed frames) that are to be considered as a group by pedestrian action predictor 916. In preparation for spatiotemporal convolution by pedestrian action predictor 916, the sequence of feature matrices are stacked into a 3D tensor of size N×Q×T.

Interaction Modelling Module 914

Interaction Modelling Module 914 is configured to construct graph structures (a graph topology that interconnects object nodes) for a spatial graph G for each observed frame $f_t$ of an observed sequence for a target pedestrian, based in part on the clusters generated by road user clustering module 912 to form a symmetric adjacency matrix A. The symmetric adjacency matrix A in combination with the node feature vectors $V_o$ generated by feature encoder module 910 collectively the spatial graph G for an observed frame $f_t$.

In this regard, interaction modelling module 914 constructs a graph topology in which the target pedestrian node (e.g., node that represents the target pedestrian) is connected by an edge with each node of each road user appearing in the scene that is represented in an observed frame $f_t$. Then, based on the clusters $c_1 = \{c_t^{(1)}, c_t^{(2)}, \ldots, c_t^{(Ncs)}\}$ generated for the observed frame $f_t$, each road user nodes is connected by and edge to every other road user node in its own cluster to form a fully-connected cluster subgraph.

The symmetrical adjacency matrix, $A_t$, at observed frame $f_t$ represents these node connections or graph edges as respective values located at element locations in the adjacency matrix, $A_t$, at which the rows and columns corresponding to different object nodes intersect (i.e., the same structure illustrated in FIG. 8 in respect of matrix $A_2$ of the preceding example embodiment).

Values in the symmetrical adjacency matrix At that correspond to connecting edges between the target pedestrian node and each of the respective road user nodes are determined by two matrices, $B_t$, a matrix encoding the relative location importance of road users to the target pedestrian, and $D_t$, a matrix representing the distance between the target pedestrian and each object. For consistency, for description of pedestrian action subsystem, the target pedestrian node will be assigned the 0th row and 0th column of the adjacency matrix $A_t$.

Figure 10:
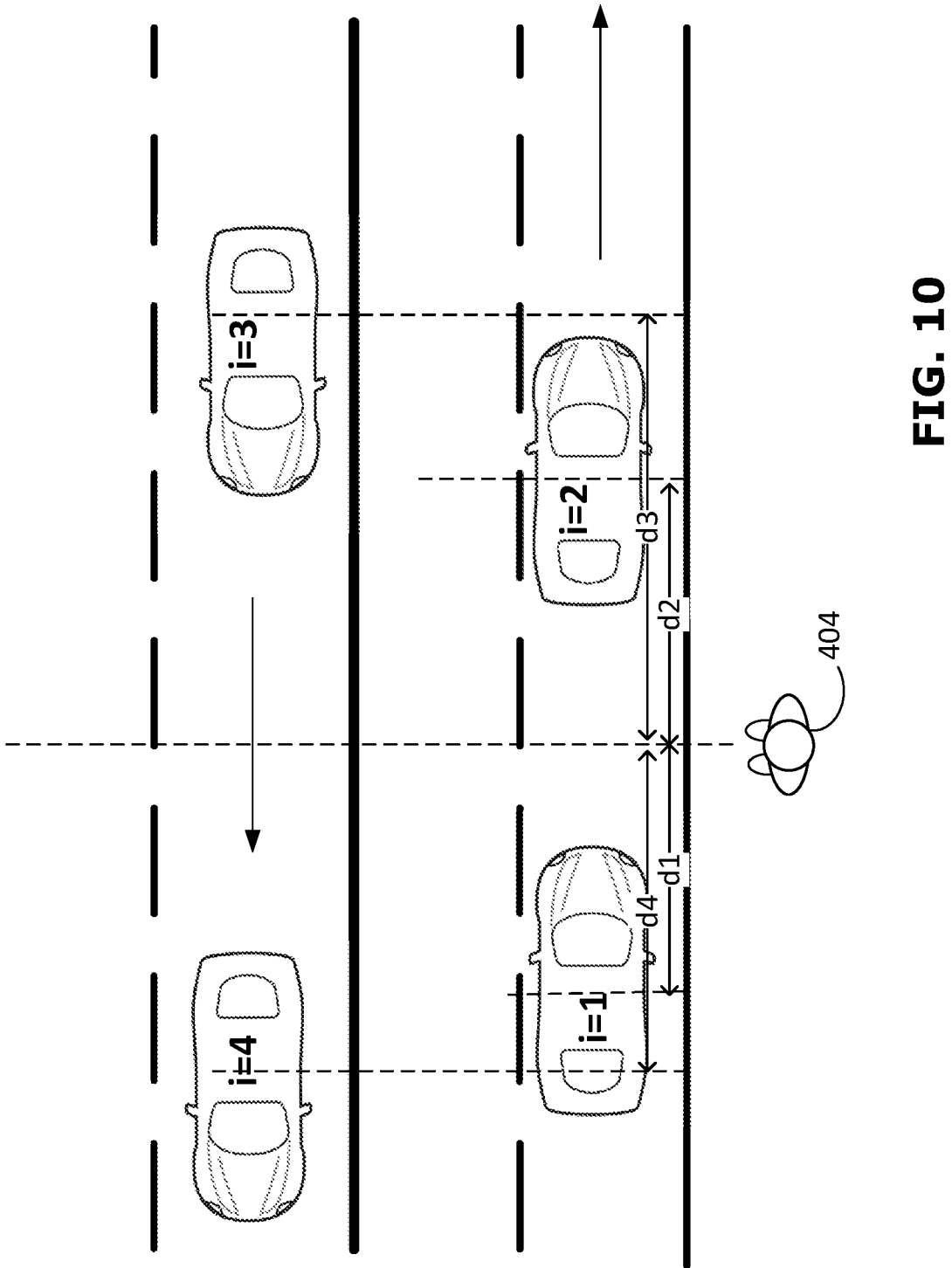
FIG. 10 illustrates an example of directional distances that can be used to determine relative location importance values according.

Relative location importance matrix, B. For objects (e.g., road users) on a drivable area of the scene represented in the observed frames, importance values for the elements of relative location importance matrix B are generated using the object's distance to the target pedestrian, calculated along the closest edge of the road to the target pedestrian, in the direction of traffic, as shown in FIG. 10. In particular, distance is measured based on a travel line that follows parallel to the road edge closest to the target pedestrian, from a point of an edge of the road lane closest to the target pedestrian that perpendicularly aligns with the road user to a point on the edge that perpendicularly aligns with the pedestrian. This travel distance measurement is robust to the driving direction of lanes and the curvature of the road. A negative value is assigned to the travel distance if the object has passed the target pedestrian (e.g., distances d2 and d4 for road users i=2 and i=4 respectively are negative values) and a positive value is assigned if the object is approaching (e.g., distances d1 and d3 for road users i=1 and i=4 respectively are positive values). Accordingly, the relative location importance of the road user is based both on a travel distance along the road, and on a direction of travel, of the road user relative to the target pedestrian.

A distance threshold, $d_{thresh}$, can be empirically set (e.g., 20 meters) for a maximum distance from the target pedestrian, and the resulting relative importance values normalized accordingly. Thus, for the $i_{th}$ object in observed frame $f_t$, which is on a drivable area of the scene, at a distance, d, along a road lane, the relative location importance values can be computed as:

$$B_t[0, i] = B_t[i, 0] = \frac{\min(\max(d, -d_{thresh}), d_{thresh}) + d_{thresh}}{2 \times d_{thresh}}.$$

For any object, j, on a non-drivable area of the scene represented in observed frame $f_t$, the respective matrix values can be set as: $B_t[0, j]=B_t[j,0]=0.5$.

For any two objects, m and n, that are part of the same cluster, the matrix locations of the relative location importance matrix Bt that correspond to object pair can be set as Bt[m,n]=Bt[n,m]=0. The value of 0 can be assigned to all diagonal elements of matrix Bt, and the remaining values that have not been yet been set are all set to 1.

Distance matrix, D. The elements of distance value matrix D are calculated using the Euclidean distance between the target pedestrian and its surrounding road users. Thus, for the $k^{th}$ object in observed frame $f_t$, $d=\|t_{(0)}{}^t-l_{(k)}{}^t\|$ Similar to the relative importance value B matrix, a predefined distance threshold (e.g., $d_{thresh}$=20 m) can be used to normalize the distances. To obtain Dt[0,k] and Dt[k, 0], the following computation can be used:

$$d = \frac{\min(d, d_{thresh})}{d_{thresh}}.$$

Similar to the importance matrix, for any two objects, m and n, that are part of the same cluster, the interaction modelling module 914 can set Dt [m,n]=Dt[n,m]=0, assign 0 to all diagonal elements of Dt, and assign all remaining elements of Dt a value of 1.

Adjacency matrix, A. Interaction modelling module 914 can compute the adjacency matrix for an observed frame $f_t$ as follows:

$$A_t=(1-B_t)\odot(1-D_t),$$

where $\odot$ denotes element-wise multiplication) to obtain the adjacency matrix $A_t$ at observed frame $f_t$. In the case of road user, target pedestrian pairs, the corresponding matrix value is a multi-factor relative importance weight, determined both on the distance between the road user and pedestrian pair as well as on a relative location importance value.

In summary, the value of adjacency matrix $A_t[i, j]$ for the ith and jth objects (i.e., target pedestrians and road users) in the scene represented in observed at frame $f_t$, will be 1 when i=j or when the objects belong in the same cluster. For all connecting edges between the target pedestrian and each road user, $0 \leq A_t[i, j] \leq 1$. When the two objects are not part of the same cluster, $A_t[i, j]=0$.

It will be noted that adjacency matrix $A_t$ [i, j] includes values that embed information similar to that described above in respect of the matrix $A_2$ described above in the context of Pedestrian action subsystem 400. Each matrix element indicates if a direct connection exists between a corresponding pair of objects detected in the scene represented by observed frame $f_t$. In the case of road user type object pairs, a "0" indicates no direct connection, meaning the pair of road users are not included in a common cluster; a "1" indicates a direct connection, meaning the pair of road users are in a common cluster. Each of the matrix elements corresponding to a pairing of a road user with the target pedestrian pair will include a respective multi-factor relative importance weight that is based on both the distance of the read user to the target pedestrian as well as a relative location importance that is determined for the road user/target pedestrian pair. The relative location importance value depends both on a distance metric and a direction of the road object relative to the target pedestrian.

In preparation for the spatiotemporal convolution of the graph, the adjacency matrix A is formatted such that for an observed sequence (i.e., T observed frames) with a total of N unique objects (including the target pedestrian and surrounding objects) across all observed frames, the adjacency matrix A will have dimension N×N at each observed frame in the sequence.

If an object in the sequence is not present in a given frame, it is not connect to any other node, which is achieved by setting all values of the adjacency matrix to zero for the corresponding rows and columns, except for the diagonal element, which is set to 1. The adjacency matrices $A_t$ for all observed frames of a target pedestrian's observed sequence, Ao={A1, A2, . . . , AT}, are stacked into a 3D tensor of dimension N×N×T and provided to the pedestrian action predictor 916.

Pedestrian Action Predictor 916

In example embodiments, the pedestrian action predictor 916 can include a Spatiotemporal Graph Convolution Neural Network. A spatial graph convolution is defined as Z=AVW [see, for example, T. Kipf and M. Welling, "Semi-supervised classification with graph convolutional networks," in ICLR, 2017], where A is the adjacency matrix at one frame, V is the corresponding feature matrix, and W contains the trainable weights of the spatial convolution layer. Extending upon this, as in [11], a spatiotemporal graph involves constructing a graph using the set of spatial graphs $G_o$={G1, G2, . . . , GT}=$(V_o,A_o)$ from the observed frames $F_o$={$f_1, f_2, . . . , f_T$} of a sequence. These graphs have the same configuration at each frame, while the edge weights in $A_t$ and features in $V_t$ vary as t ranges from 1 to T.

When performing spatiotemporal graph convolution component, pedestrian action predictor 916 can leverage the clustering information embedded in adjacency matrix $A_o$ by using two layers of spatial convolution, thus incorporating a level of each object's indirect neighbours into the convolution. A convolution in the temporal dimension can be performed using, for example, a kernel size of 3, combining a given observed frame's information with that of its previous and next observed frames.

The target pedestrian's embeddings can be denoted as P, having dimensions of $1 \times \tilde{Q} \times T$, where the value of hyper parameter $\tilde{Q}$ is empirically selected (for example $\tilde{Q}$=512) and corresponds to an output dimension.

Encoding Target Pedestrian and Ego-Vehicle Dynamics. To directly capture information pertaining to target pedestrian and ego-vehicle dynamics, a vector of target pedestrian features can be encoded, $\vec{p}_t=[p_{x,t}, p_{y,t}, p_{vx,t}, p_{vy,t}]$, along with a vector of ego-vehicle features, $\vec{e}_t=[e_{x,t}, e_{y,t}, e_{vx,t}, e_{vy,t}]$, at each observed frame $f_t$. Here, x and y are the locations of the target pedestrian and ego-vehicle and vx and vy are the velocities in the global bird's-eye-view reference frame. Velocity is calculated as $[vx, vy]=(1_t^{(i)}-1_{t-1}^{(i)})$, for $t=2, \ldots,$ T where i is the target pedestrian or ego-vehicle. At $t=1$, $[vx, vy]$ are set to $[0,0]$. The velocity can be multiplied by a scaling factor (e.g., 1000) to scale it to an order of magnitude that is similar to the global x and y coordinates.

Action Classification. In an illustrative example, of pedestrian action predictor 916, to generate a prediction (e.g., probability that pedestrian will cross or will not cross, the target pedestrian's graph embeddings, P, the pedestrian dynamics, $\vec{p}_t=[p_{x,t}, p_{y,t}, p_{vx,t}, p_{vy,t}]$ and the ego-vehicle dynamics, $\vec{p}_t=[p_{x,t}, p_{y,t}, p_{vx,t}, p_{vy,t}]$ are fed to three respective long short term memory (LSTM) networks. The three resulting hidden states are concatenated and fed to an attention layer, then passed through a dense layer for classification. For training, binary cross-entropy loss can be used in an example embodiment.

A person of ordinary skill in the art may be aware that, in combination with the examples described in the embodiments disclosed in this disclosure, units and algorithm steps may be implemented by electronic hardware or a combination of computer software and electronic hardware. Whether the and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure. The content of any published papers referenced in this disclosure are incorporated herein by reference.

The invention claimed is:

1. A computer implemented method for predicting a pedestrian action, the method comprising:

receiving a temporal sequence of observed frames, each observed frame including spatial information for a target pedestrian and a plurality of road users;

for each observed frame in the sequence of observed frames:

encoding, based at least on the spatial information included in the observed frame, a set of target pedestrian features for the target pedestrian and a respective set of road user features for each of the plurality of road users;

generating, based at least on the spatial information included in the observed frame, a set of relative importance weights that includes, for each of the road users, a respective relative importance weight that indicates a relative importance of the road user to the target pedestrian, the respective relative importance weight for each road user being based both on a distance between the road user and the target pedestrian and a relative location importance of the road user to target pedestrian;

clustering, based on the spatial information included in multiple observed frames in the sequence including the observed frame, groups of road users from the plurality of road users into respective clusters based on behavioral similarities, wherein each of the respective clusters identifies a group of similar behaved road users;

predicting, based on the set of target pedestrian features encoded for each of a plurality of the observed frames, the respective sets of road user features encoded for each of the plurality of the observed frames, the set of relative importance weights generated for each of the plurality of the observed frames, and the respective clusters, a future action of the target pedestrian; and automatically controlling an action of an autonomous vehicle based on the predicted future action of the target pedestrian.

2. The method of claim 1, wherein the relative location importance for each road user is based on a direction of movement of the road user relative to the target pedestrian.

3. The method of claim 2, wherein the relative location importance for each road user is given a greater importance if the road user is moving towards the target pedestrian than if the road user is moving away from the target pedestrian.

4. The method of claim 2, wherein the relative location importance for each road user is further based on a travel distance of the road user along a road relative to a position of the target pedestrian.

5. The method of claim 2, wherein relative location importance for each road user is based on a distance of the road user from a reference line that extends from the position of the target pedestrian and is perpendicular to a roadway direction of travel.

6. The method of claim 1, wherein, for each road user, the distance between the road user and the target pedestrian is a Euclidian distance.

7. The method of claim 1, wherein for each observed frame in the sequence of observed frames:

encoding the set of target pedestrian features for the target pedestrian and a respective set of road user features for each of the plurality of road users is based on the spatial information included in multiple observed frames in the sequence including the observed frame; and generating the set of relative importance weights for each road user is based on the spatial information included in multiple observed frames in the sequence including the observed frame.

8. The method of claim 1, wherein a respective spatial graph is generated for each of the observed frames, wherein for each observed frame:

the respective spatial graph has a target pedestrian node representing the target pedestrian, and a plurality of road user nodes each representing a respective one of the plurality of road users, the respective spatial graph being defined by: (i) a feature matrix that includes the encoded target pedestrian features as features of the target pedestrian node, and includes the set of road user features encoded for the respective road users as features of the respective road user nodes; and (ii) an adjacency matrix that specifies: (a) respective weighted connecting edges between the target pedestrian node and each of the respective road user nodes corresponding to the set of relative importance weights generated for the observed frames; and (b) connecting edges between each of the road user nodes that are included in a respective cluster.

9. The method of claim 8, wherein predicting the future action of the target pedestrian is performed using a spatiotemporal convolutional graph neural network that receives the spatial graphs generated for the observed frames.

10. The method of claim 1, wherein the predicted pedestrian action is one of the pedestrian will cross in front of the autonomous vehicle or the pedestrian will not cross in front of the autonomous vehicle.

11. The method of claim 1, wherein for each observed frame in the sequence of observed frames: the set respective set of road user features encoded for each of the plurality of road users includes one or more of: a type of the road user; a location of the road user relative to the target pedestrian, a size of the road user, a velocity of the road user, and a direction of movement of the road user.

12. A processing system comprising:

one or more processor systems;

one or more non-transitory memories storing instructions which when executed by the one or more processor systems cause the one or more processing systems to perform a method for predicting a pedestrian action comprising:

receiving a temporal sequence of observed frames, each observed frame including spatial information for a target pedestrian and a plurality of road users;

for each observed frame in the sequence of observed frames:

encoding, based at least on the spatial information included in the observed frame, a set of target pedestrian features for the target pedestrian and a respective set of road user features for each of the plurality of road users;

generating, based at least on the spatial information included in the observed frame, a set of relative importance weights that includes, for each of the road users, a respective relative importance weight that indicates a relative importance of the road user to the target pedestrian, the respective relative importance weight for each road user being based both on a distance between the road user and the target pedestrian and a relative location importance of the road user to target pedestrian;

clustering, based on the spatial information included in multiple observed frames in the sequence including the observed frame, groups of road users from the plurality of road users into respective clusters based on behavioral similarities, wherein each of the respective clusters identifies a group of similar behaved road users;

predicting, based on the set of target pedestrian features encoded for each of a plurality of the observed frames, the respective sets of road user features encoded for each of the plurality of the observed frames, the set of relative importance weights generated for each of the plurality of the observed frames, and the respective clusters, a future action of the target pedestrian; and automatically controlling an action of an autonomous vehicle based on the predicted future action of the target pedestrian.

13. The system of claim 12, wherein the relative location importance for each road user is based on a direction of movement of the road user relative to the target pedestrian, and the relative location importance for each road user is given a greater importance if the road user is moving towards the target pedestrian than if the road user is moving away from the target pedestrian.

14. The system of claim 13, wherein the relative location importance for each road user is further based on a travel distance of the road user along a road relative to a position of the target pedestrian.

15. The system of claim 14, wherein relative location importance for each road user is based on a distance of the road user from a reference line that extends from the position of the target pedestrian and is perpendicular to a roadway direction of travel.

16. The system of claim 12, wherein for each observed frame in the sequence of observed frames, the method includes:

encoding the set of target pedestrian features for the target pedestrian and a respective set of road user features for each of the plurality of road users is based on the spatial information included in multiple observed frames in the sequence including the observed frame; and generating the set of relative importance weights for each road user is based on the spatial information included in multiple observed frames in the sequence including the observed frame.

17. The system of claim 12, wherein a respective spatial graph is generated for each of the observed frames, wherein for each observed frame:

the respective spatial graph has a target pedestrian node representing the target pedestrian, and a plurality of road user nodes each representing a respective one of the plurality of road users, the respective spatial graph being defined by: (i) a feature matrix that includes the encoded target pedestrian features as features of the target pedestrian node, and includes the set of road user features encoded for the respective road users as features of the respective road user nodes; and (ii) an adjacency matrix that specifies: (a) respective weighted connecting edges between the target pedestrian node and each of the respective road user nodes corresponding to the set of relative importance weights generated for the observed frames; and (b) connecting edges between each of the road user nodes that are included in a respective cluster.

18. A non-transitory computer-readable medium storing machine executable instructions which when executed by one or more processor systems cause the one or more processor systems to perform a method for predicting a pedestrian action comprising:

receiving a temporal sequence of observed frames, each observed frame including spatial information for a target pedestrian and a plurality of road users;

for each observed frame in the sequence of observed frames:

encoding, based at least on the spatial information included in the observed frame, a set of target pedestrian features for the target pedestrian and a respective set of road user features for each of the plurality of road users;

generating, based at least on the spatial information included in the observed frame, a set of relative importance weights that includes, for each of the road users, a respective relative importance weight that indicates a relative importance of the road user to the target pedestrian, the respective relative importance weight for each road user being based both on a distance between the road user and the target pedestrian and a relative location importance of the road user to target pedestrian;

clustering, based on the spatial information included in multiple observed frames in the sequence including the observed frame, groups of road users from the plurality of road users into respective clusters based on behavioral similarities, wherein each of the respective clusters identifies a group of similar behaved road users;

predicting, based on the set of target pedestrian features encoded for each of a plurality of the observed frames, the respective sets of road user features encoded for each of the plurality of the observed frames, the set of relative importance weights generated for each of the plurality of the observed frames, and the respective clusters, a future action of the target pedestrian; and automatically controlling an action of an autonomous vehicle based on the predicted future action of the target pedestrian.

* * * * *